J. LOMAS.
Shedding Mechanism for Looms.
No. 137,937. Patented April 15, 1873.
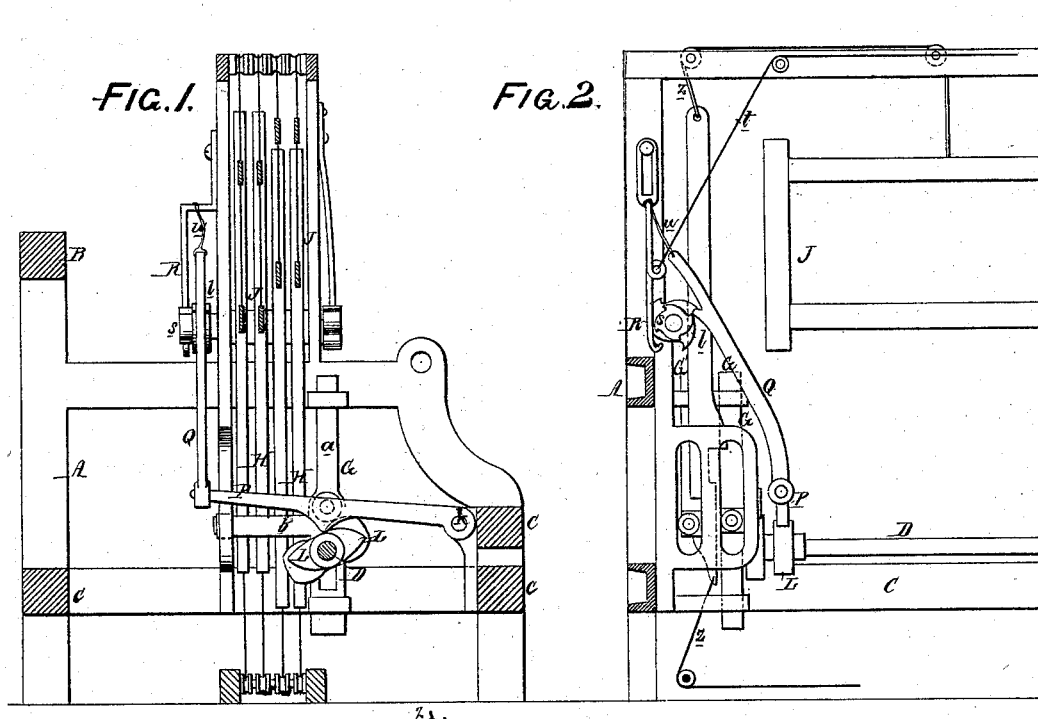
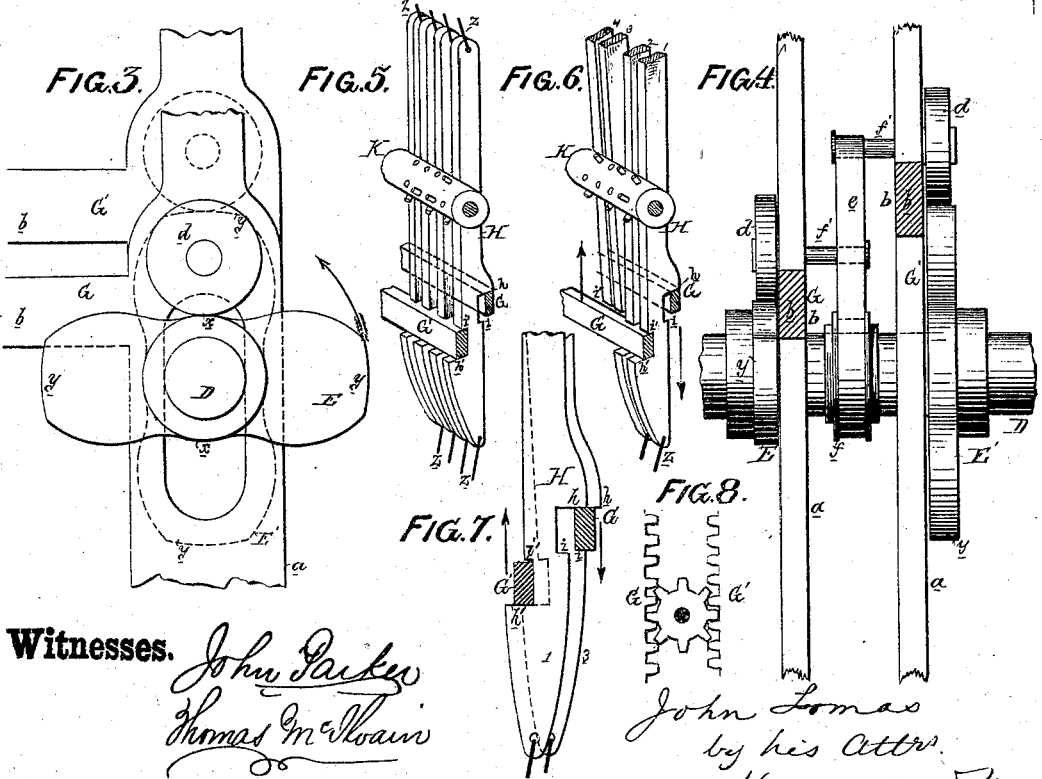
Witnesses. John Parker
Thomas McIlvain
John Lomas
by his Attys.
Howson and Son

UNITED STATES PATENT OFFICE.

JOHN LOMAS, OF KELLYVILLE, PENNSYLVANIA.

IMPROVEMENT IN SHEDDING MECHANISMS FOR LOOMS.

Specification forming part of Letters Patent No. 137,937, dated April 15, 1873; application filed May 31, 1872.

*To all whom it may concern:*

Be it known that I, JOHN LOMAS, of Kellyville, Delaware county, Pennsylvania, have invented Improvements in Looms, of which the following is a specification:

My invention consists of certain improvements, too fully explained hereafter to need preliminary description, in jacks for controlling the harness of what are known as witch-looms; also in mechanism for operating the said jacks, and for rotating and reversing the cylinder, by which the said jacks are shifted laterally, in order to be brought within the influence of either of the reciprocating jack-frames.

In the accompanying drawing, Figure 1 is a sectional view of sufficient of a loom to illustrate my improvements; Fig. 2, a section on the line 1 2, Fig. 1; Figs. 3 and 4, enlarged views of the cams for operating the jack-frames; Figs. 5 and 6, perspective views of the jacks and operating devices; Fig. 7, a diagram illustrating the method of operating the jacks; and Fig. 8, a view of a modification.

A represents one of the side frames of the loom; B, the breast-beam; C C C, cross-pieces; and D, the cam-shaft, turning in suitable bearings in the frame, and having, near one end, two cams, E and E', for reciprocating, through the medium of jack-frames G and G', the vertical jacks H, by which the leaves of heddles J, to which the warp-threads are attached, are raised and lowered, in order to open and close the shed. The cords $z$ at the upper and lower ends of the jacks are inclined, as shown in Figs. 2 and 5, and tend to hold the same in the path of the jack-frame G'; but the said jacks can be pushed laterally in the opposite direction, so as to be brought into the path of the reciprocating frame G, by pins on a cylinder, K, which extends across the whole number of jacks, and has an intermittent rotary motion imparted to it by a cam, L, on the cam-shaft, as will be hereafter described. (See Figs. 5 and 6.) Each jack-frame consists of a vertical bar, $a$, and horizontal bar $b$, Figs. 3 and 4, the former being guided partly by the fixed frame, and partly by the cam-shaft, which extends through a slot in the same, and the bar $b$ being secured to the bar $a$, and extending across the whole of the series of jacks. The bar $a$ of the frame G has a roller, $d$, which rests upon the operating-cam E, and the frame G' has a similar roller, which rests upon the cam E'. The cams are duplex, and are arranged upon the shaft at right angles to each other, as plainly shown in Figs. 3 and 4, so that they shall lift the frames alternately, and twice for each revolution of the shaft. The weight of the frames would, in most cases, be sufficient to cause them to descend; but in order to make this movement positive and regular the two jack-frames are so connected together that the elevating of one shall have the effect of depressing the other, thus causing the rollers $d$ to rest constantly upon the cams. The connection is made in the present instance by a strap, $e$, Fig. 4, passing around a loose pulley, $f$, on the cam-shaft, and secured at its opposite ends to pins $f'$ on the inner sides of the jack-frames. A positive alternate movement of the jack-frames could also be obtained through the medium of a loose pinion hung to a projection of the fixed frame, and gearing at opposite sides into racks on the inner edges of the jack-frames, as shown in Fig. 8.

It will be observed, on reference to Fig. 3, that those portions $x$ $x$ and $y$ $y$ of each of the duplex cams which are closest to and furthest removed from the shaft are arcs of circles, described from the center of the latter, so that, as the two cams are arranged at right angles to each other, the concentric portions $x$ $x$ of one cam will be directly opposite the portions $y$ $y$ of the other, and therefore, as these portions of the cams merely support, without raising or lowering, the jack-frames, there will be a simultaneous dwell or cessation in the movements of the latter when one is at the extremity of its upward and the other at the extremity of its downward movement, the object of which will be hereafter described.

Upon one edge of each of the jacks H are formed two shoulders, $h$ and $i$, and upon the opposite edge two similar but reversed shoulders, $h'$ and $i'$. The shoulders $i$ and $i'$ are on line with each other, and the jack, at the point where they occur, is of a width about equal to the distance between the horizontal bars of the jack-frames G and G'. (See Fig. 7.) The shoulders $h$ and $h'$ are situated one considerably above the other, and are of such width that the former shall always extend over the frame G and the latter beneath the frame G', whether the jacks be moved laterally in one direction or the other. The said frames are therefore prevented from passing the shoulders $h$ and $h'$, but are caused to strike the same, and to thus bring the whole number of jacks into line whenever the frame G is raised to its full extent, and the frame G' correspondingly lowered. (See Fig. 5.) This leveling and holding of the jacks occur simultaneously with the dwell or cessation in the movements of the jack-frames, caused by the passage over the rollers $d$ on the latter of the concentric portions $y\,y$ of the cam E and $x\,x$ of the cam E'; or, in other words, when the said cams are in a position the reverse of that shown in Fig. 3. While the jacks are thus held, and while the shed remains closed, a partial turn is given the cylinder K, for the purpose of bringing another set of its pins opposite the jacks, and of thus moving the same laterally, in order to bring some of them into the path of the frame G, while the others, which are not struck by the pins, remain in the path of the frame G'. In Fig. 6, for instance, the jacks 1 and 2 are not struck by the pins of the cylinder, and therefore remain with their shoulders $i'$ resting upon the upper edge of the frame G', while the remaining jacks, 3 and 4, are moved laterally by the pins to a sufficient extent to withdraw their shoulders $i'$ from the frame G', and to extend their shoulders $i$ beneath the frame G, as plainly shown in Fig. 7. As soon as the parts have been thus adjusted the jack-frames operated by the cams will move in the direction of their respective arrows, Figs. 6 and 7, the jacks 1 and 2 being elevated by the frame G' acting upon their shoulders $i'$, and the jacks 3 and 4 being correspondingly depressed by the frame G. After the opening of the shed by the above movement of the jacks and jack-frames, the parts will, before their movement is again reversed, be held stationary for an instant, in order to allow sufficient time for the passage of the shuttle, this occurring during the time that the concentric portions of the cams E and E' are acting upon the jack-frames, as shown in Figs. 3 and 4. The jacks 1 and 2 will next be depressed by the frame G' acting upon their shoulders $h'$, and the jacks 3 and 4 will be raised by the frame G acting upon their shoulders $h$, the movement ceasing when the said frames are brought to such a position as to be in contact with the shoulders $h'$ and $h$ of the whole series of jacks, in order to level the latter, as before described.

It will be understood, without further description, that with jacks of the peculiar construction above described, operated by frames to which a positive movement is imparted in both directions, the said jacks must be uniformly raised, lowered, and leveled, without risk of slipping from the frames; while, as there is a dwell at the extremity of both the upward and downward movement of the frames and jacks, sufficient time is afforded to shift the latter by means of the cylinder K, and for the passage of the shuttle through the open warp. The weaving, therefore, will be much more uniform, and there will be less risk of false movements of the jacks than in other looms of this class in which the movements of the jack-frames are continuous, and in which the weight of the parts is depended upon to move the jacks in one direction. Another important feature of my invention is that the cams E and E' are so arranged in respect to the lathe that whenever the latter falls back, the shed shall be open, whether such movement occur during the operation of the loom, or by a reversing of the parts, caused by the weight of the lathe after the stopping of the loom. Imperfections in the weaving are thus prevented, for if one or more false shots be made the threads can be readily removed when the shed is open.

The method of operating the cylinder K from the duplex cam L on the cam-shaft is as follows: A lever, P, Figs. 1 and 2, hung to the loom-frame at $k$, rests upon the cam L, and is connected at its outer end to a pawl, Q, which is maintained in contact with and acts upon the teeth of a ratchet-wheel, $l$, secured to the journal of the cylinder. This pawl turns the cylinder to the extent of one tooth, and thus resets the same twice for each single revolution of the cam-shaft, the movement of the cylinder occuring, as before described, when the jacks are leveled and at rest.

As it is often necessary to reverse the motion of the cylinder, in order to properly continue the pattern, after stopping the loom, and picking out or piecing broken threads, I have combined with the said cylinder a device by which it may be thus reversed without compelling the attendant (who generally stands at the side of the loom opposite that to which the cylinder is attached) to leave his post in order to reach the said cylinder. This device consists of a vertically-sliding pawl, R, operated by a cord, $t$, which extends across the top of the loom-frame, and adapted at its lower end to a ratchet-wheel, $s$, on the journal of the cylinder K, having the same number of teeth as the ratchet-wheel $l$, but pointing in the opposite direction. The pawl Q is so connected by a cord, $u$, to the pawl R that, when the latter is elevated for the purpose of turning the wheel $s$ in such a direction as to reverse the motion of the cylinder, it shall first raise the said pawl Q clear of the teeth of its ratchet-wheel $l$, in order to permit such movement.

As a modification of my invention, it may be remarked that the jack-frames G and G' could be operated from the upper instead of from the lower shaft of the loom; but as the said upper shaft makes two revolutions for one of the lower, the cams E and E' would in such case have to be single instead of duplex.

I claim as my invention—

1. The jacks having shoulders $h\,h'\,i\,i'$, in combination with frames G G', and with the cams E E', arranged at right angles to each other, all operating as set forth.

2. The frames G G', operated directly by the cams E E', and maintained in contact therewith by means of the coupling-strap, or its equivalent, as described.

3. The combination, with the cylinder K and pawl Q, of the ratchet-wheel S, pawl R, and cords $t$ and $u$, all arranged and operating substantially as and for the purpose set forth.

In testimony whereof I have signed my name to this specification in the presence of two subscribing witnesses.

JOHN LOMAS.

Witnesses:
WM. A. STEEL,
JOHN K. RUPERTUS.